C. T. HENDERSON.
CLUTCH.
APPLICATION FILED FEB. 1, 1913.
1,258,115.
Patented Mar. 5, 1918.
2 SHEETS—SHEET 2.
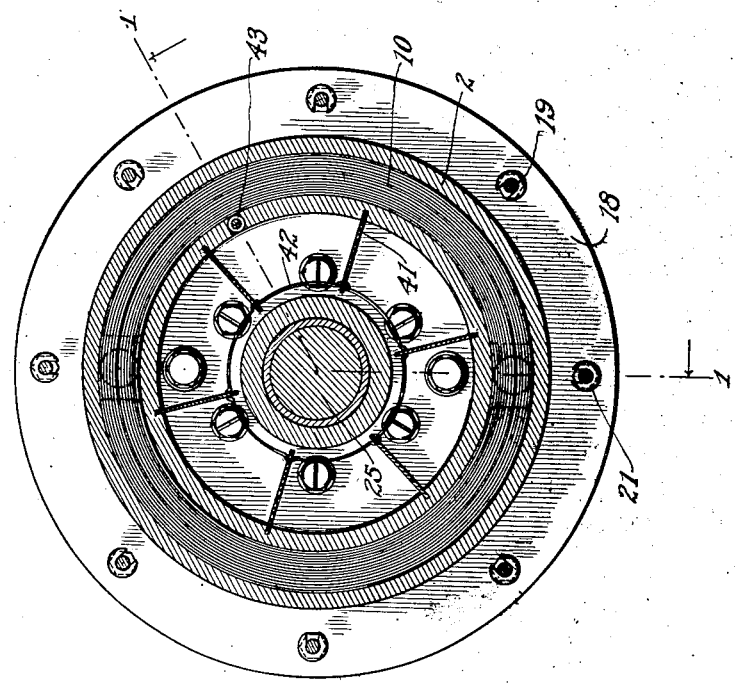
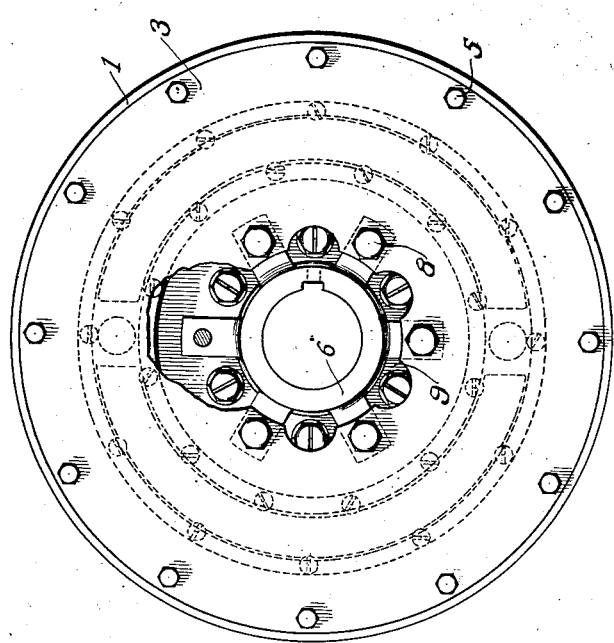
Witnesses:
Robert H. Weir
J. L. Johnson
Inventor:
Clark T. Henderson

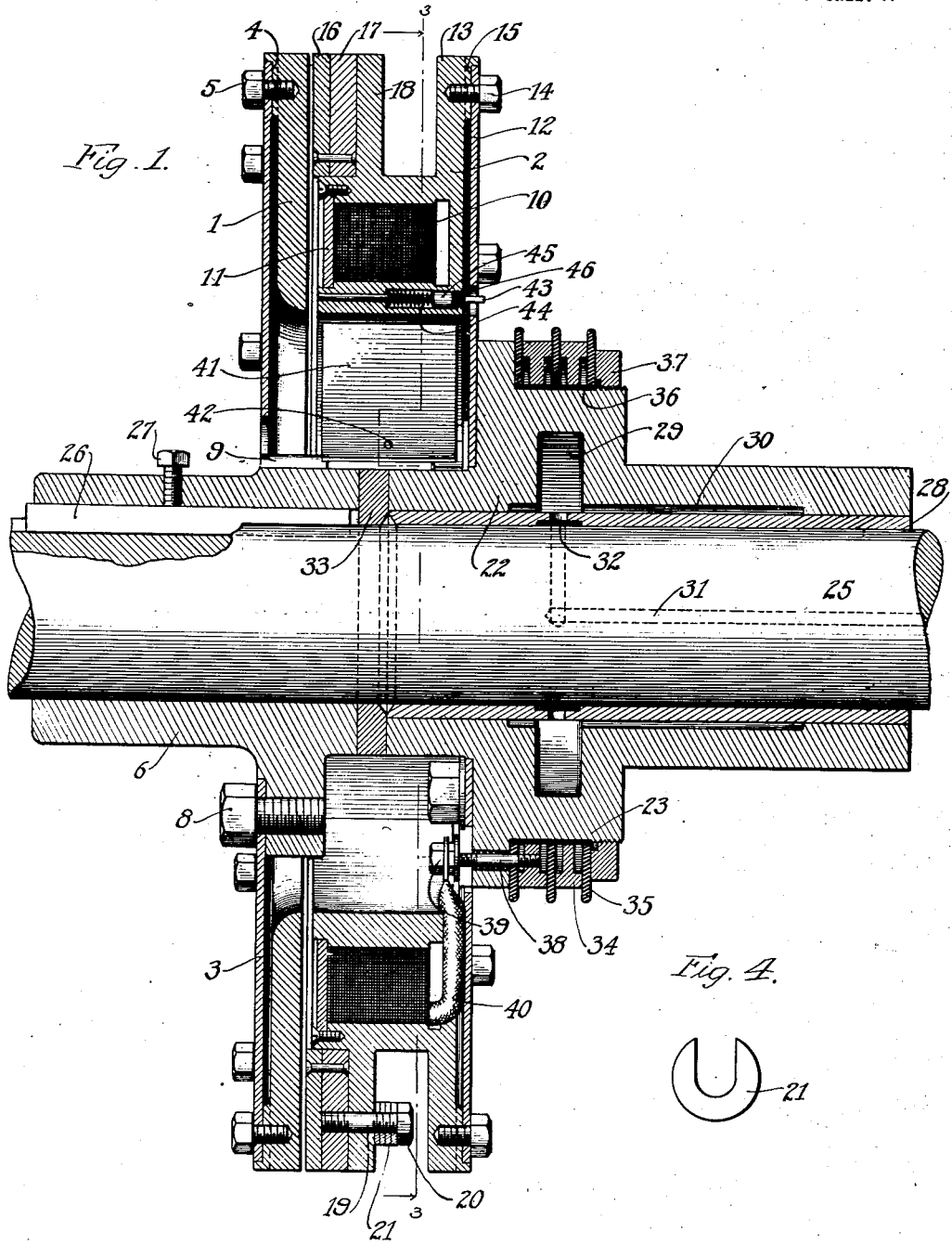

UNITED STATES PATENT OFFICE.

CLARK T. HENDERSON, OF MILWAUKEE, WISCONSIN, ASSIGNOR, BY MESNE ASSIGNMENTS, TO THE CUTLER-HAMMER MFG. CO., OF MILWAUKEE, WISCONSIN, A CORPORATION OF WISCONSIN.

CLUTCH.

1,258,115.   Specification of Letters Patent.   Patented Mar. 5, 1918.

Application filed February 1, 1913. Serial No. 745,718.

*To all whom it may concern:*

Be it known that I, CLARK T. HENDERSON, a citizen of the United States, residing at Milwaukee, in the county of Milwaukee and State of Wisconsin, have invented new and useful Improvements in Clutches, of which the following is a full, clear, concise, and exact description, reference being had to the accompanying drawing, forming a part of this specification.

My invention relates to improvements in clutches.

One of its objects is to provide improved means to mount clutch members. Another object is to provide a clutch with means for ventilation. Other objects of my invention will hereinafter appear.

A clutch embodying my invention is illustrated in the accompanying drawings. It will, of course, be understood that my invention may be embodied in various other forms, and that the clutch illustrated may be modified in many particulars and still contain the advantageous features of my invention.

The figures in the accompanying drawings are as follows:

Figure 1 is a sectional elevation of the clutch on line 1—1 Fig. 3.

Fig. 2 is an end view.

Fig. 3 is a transverse section on the line 3—3 Fig. 1.

Fig. 4 is a face view of one of the washers.

The clutch consists, in general, of two rotary members. Either of these members may be the driven member and the other the driving member, and likewise, in a magnetic clutch, either may be the magnet member and the other the armature member, or both may be magnet members. But the clutch shown in the drawing is particularly adapted to practice. It is desirable that the magnet member be the driving member, so as to avoid sudden starting, which is liable to cause the energizing winding to slip.

The clutch illustrated has an armature member 1 and a magnet member 2. The armature member is in the form of a ring which is supported by means of a spring disk 3. The armature ring and the disk are attached to each other near their outer peripheries. The disk preferably bears against bosses 4, formed upon the armature ring so as to separate the armature from the disk and thus provide a passage between the same. The disk and armature are attached to each other by means of bolts 5.

The disk is carried by a hub 6. It has a central opening to receive the hub. The hub is provided with radial arms to which the disk is fastened by bolts 8. Intermediate the radial arms are passages 9 formed by openings between the disk and the hub, the disk preferably having semi-circular openings so as to enlarge the passage.

The magnet member 2 is in the form of a ring. A magnetizing coil 10 is located in an annular recess in the face of the magnet ring, and is held in place by means of a non-magnetic ring 11, which is counter-sunk in the face of the magnet ring.

The magnet ring is mounted upon a spring disk 12 in the same manner as the armature member. It has an annular flange 13 to which the disk 12 is fastened by means of bolts 14. The disk bears against bosses 15 formed upon this flange, so as to provide a passage between the magnet ring and the disk.

A wearing ring or shoe 16 is carried by the magnet ring so as to prevent the armature ring from coming into direct contact with the polar faces of the magnet ring. This shoe is preferably made of any suitable wearing or friction material. It is preferably riveted to a supporting ring 17, which surrounds the magnet ring and is fastened to a flange 18, extending around the periphery of the magnet ring. Bolts 19 are preferably threaded into the supporting ring. They pass through the flange 18 and are provided with nuts 20. Washers 21 are preferably arranged upon each bolt and are interposed between the nut and the flange. These washers are preferably of the form illustrated in Fig. 4, they being open at the side so that they may be readily applied and removed from the bolts without removing the nuts. When the shoe wears away these washers may be removed from the rear of the flange and placed in front thereof, so as to set out the shoe sufficiently to separate the armature from the face of the magnet ring.

The space between the flanges 13 and 18 increases the radiating surface and facilitates ventilation.

The clutch members may be carried by a shaft 25 passing through the hubs 6 and 22. The hub 6 is preferably fixed to the shaft by means of a key 26 which is held in place by a set screw 27. A bearing sleeve 28 is preferably interposed between the hub 22 and the shaft. The hub 22 is provided with an annular channel 29 and longitudinal grooves 30 to receive lubricant. The shaft 25 may be provided with a hole 31, through which lubricant is supplied. The bearing sleeve is provided with a hole 32 communicating with the hole 31 and the channel 29. A thrust ring 33 is preferably interposed between the hubs of the clutch members. This thrust ring and the bearing sleeve 28 are preferably beveled at their adjacent ends, so as to facilitate the passage of lubricant to the bearing between the thrust ring and the hub 22.

Collecting rings 34, through which current is supplied to the energizing coil, are mounted upon the flange 23. The collecting rings are insulated by insulating washers 35 and an insulating sleeve 36. A collar 37 is threaded upon the flange 23, and the collecting rings are clamped between this collar and a shoulder on the flange.

Suitable connections are made between the collecting rings and the energizing coil. The connection between one of these rings and one terminal of the energizing coil is illustrated. The connection between the other end of the coil and the other collecting ring is similar. A terminal bolt 38 extends through the flange and is threaded into the collecting ring. It is provided with a nut 39 by means of which the terminal 40 of the coil is connected to the terminal bolt 38.

The magnet ring carries blades 41. These blades are set in slots in the inner periphery of the magnet ring and project inwardly. A wire or rod 42, which is preferably passed through holes at the inner ends of the blades, is bent at each blade so as to hold the end of the blade in place.

A pin 43 is slidably mounted in the magnet ring. It extends from the face of this ring to the rear thereof, and passes through an opening in the disk 12. A spring 44 surrounds the pin and is arranged between a shoulder formed in the opening that receives the pin and a collar 45 fastened to the pin. The pin is retained in place by a threaded collar 46. The inner end of the pin is normally flush with the polar face of the magnet ring. By means of this pin it may be readily determined whether or not the armature member is separated from the magnet ring when the clutch members are connected. If it is found that the pin cannot be pressed inwardly, then it is apparent that the shoe has worn away so much that the armature engages the polar face of the magnet ring. It is then necessary to set out the shoe sufficiently to prevent the armature from engaging the magnet ring.

The spring disks allow the clutch members to be brought into contact and also serve to separate them from each other when the coil is deënergized. Of course, other resilient means may be employed to mount the clutch rings, but spring disks are well adapted to the purpose and have advantages.

The advantage which is attained by fastening the members to the disk at their outer peripheries is that it enables a disk which is sufficiently strong to transmit power to have sufficient resiliency to permit the members to readily engage each other. This is particularly important in magnetic clutches of small diameter.

The passages between the members and their disk facilitate ventilation, thereby keeping the magnet cool. The blades on the magnet member cause the air to freely circulate through the ventilating passages. The air may enter the passages 9 and thence pass through the spaces between the disks and the rings, the blades increasing the circulation of the air. When the magnets are separated the air passes between the faces of the two rings.

The shoe prevents the polar faces of the magnet ring from directly engaging the armature ring, thereby providing an air space between the magnet ring and the armature. Accordingly, the armature is readily released when the coil is deënergized as the air gap interrupts the residual magnetism.

Having thus described my invention, what I claim as new and desire to secure by Letters Patent of the United States is:

1. In a clutch, a circular clutch member and a resilient supporting disk therefor, said disk and said member being secured together contiguous to their outer peripheries and in a normally spaced relation.

2. In a clutch, a magnetic member having an annular part and a part projecting perpendicularly from the outer periphery of said annular part, a magnet winding mounted in said annular part of said member and a spring supporting plate for said member attached to said projecting part thereof.

3. In a clutch, a magnetic member having an annular part to receive a magnet winding and spaced flanges projecting perpendicularly from the outer periphery of said part, a spring supporting disk for said member secured to one of said flanges contiguous to the outer periphery thereof and a friction ring for said member secured to the other of said flanges.

4. In a clutch, a clutch member having a central ventilating opening, a winding carried thereby contiguous to said opening and a resilient support for said member normally spaced therefrom and secured thereto adjacent to the outer edge thereof.

5. In a clutch, a circular clutch member having a central ventilating opening, a concentric magnet winding carried by said member contiguous to said opening and a resilient supporting disk for said member, said member and said disk being secured together contiguous to their outer peripheries and being spaced to provide a ventilating passage therebetween in communication with said central ventilating opening.

6. In a clutch, a circular clutch member having a central ventilating opening, an annular winding recess concentric with and adjacent to said opening and a peripheral extension of greater radius than said winding recess and a spring supporting disk for said member secured to said extension and in a spaced relation with said member to provide a ventilating passage in communication with said central opening.

7. In a clutch, the combination with a circular clutch member having a central ventilating opening, a concentric winding recess and spaced peripheral flanges, of a spring supporting disk for said member secured to one of said flanges and an annular friction member secured to the other of said flanges, said disk being spaced from said member to afford a ventilating passage in communication with said central opening.

8. In a magnetic clutch, a clutch member, and a spring disk for carrying said member, said disk and member having a passage between the same for ventilation.

9. In a clutch, the combination with an annular clutch member carrying an annular magnet winding, of a spring supporting disk for said member secured adjacent the periphery thereof, said disk and member having a ventilating passage between the same and means located within the inner periphery of said member for effecting a circulation of air through said passage.

10. In a clutch, the combination with an annular clutch member having one of its faces provided with a concentric recess adjacent the inner periphery thereof, of a magnet winding carried in said recess, a spring supporting disk for said member secured adjacent the periphery thereof, said disk and member having a ventilating passage between the same and a plurality of fan blades mounted on the inner periphery of said member for effecting a circulation of air through said passage.

11. In a clutch, the combination with two relatively movable annular clutch members, of a magnet winding carried by one of said members, a spring supporting disk secured to each of said members, each of said members having a ventilating passageway between the same and its respective supporting disk, and means located within the inner periphery of one of said clutch members for effecting a circulation of air through said passages.

12. In a clutch, a clutch member in the form of a ring, a hub having radial arms, a spring disk having an opening to receive said hub and attached to said arms, said member being carried by said disk.

13. In a magnetic clutch, a clutch member, a spring disk supporting the same, and an air passage through said disk.

14. In a magnetic clutch, a clutch member, a supporting spring disk therefor, a hub, and radial arms projecting from said hub, said disk being fastened to said radial arms and having openings between said arms for the passage of air.

15. In a magnetic clutch, in combination, two relatively rotatable spring disks, one of the same having openings therein near its axis, an annular clutch member secured to each of said spring disks adjacent to the outer peripheries of both, each of said disks and its respective clutch member having air passages between the same, a magnet winding mounted in one of said clutch members between the engaging parts of said members and the axis thereof and blades carried by one of said members and projecting into the space between said winding and the axis of said clutch members to cause a circulation of air through the clutch.

16. In a magnetic clutch, in combination, a rotatable spring disk, an annular magnet carrying member having spaced annular flanges on its outer periphery, said disk being secured adjacent to its outer periphery to one of said flanges, an annular wearing plate secured to the other of said flanges, a second spring disk rotatable relative to said first disk, and an annular clutch member secured to said second disk contiguous to the outer periphery thereof and having a face to be engaged by said wearing plate and a portion projecting into proximity with the magnet carrying portion of said first mentioned member.

17. In a magnetic clutch, in combination, two axially alined hubs, a spring disk fixed to each of said hubs, coöperating annular clutch members fixed to said disks contiguous to the outer periphery of each, one of said disks having openings contiguous to its respective hub and each of said disks and its respective clutch member having air passages between the same, blades secured to one of said clutch members between the same and said hubs to cause a circulation of air through the clutch, engaging parts on said clutch members adjacent to their outer peripheries, an annular magnet winding mounted in one of said members between said blades and said engaging parts of said clutch members, and said magnet carrying member having an annular external recess providing an increased radiating surface contiguous to said winding.

18. In a magnetic clutch, a magnet carrying clutch member, a wearing plate therefor, bolts for securing said wearing plate to said member, and washers on said bolts between the ends thereof and said member, said washers being adjustable upon said bolts to positions between said plate and said member for adjustment of said plate to compensate for the wear thereof.

19. In a magnetic clutch, an annular magnet carrying clutch member, an annular flange on the outer periphery of said member inset from the active face of said member, an annular wearing plate adapted to fit over said annular clutch member, bolts for securing said plate to said flange, and washers on said bolts between the ends thereof and said plate, said washers being bodily adjustable upon said bolt to positions between said plate and said flange for adjustment of said plate.

20. In a magnetic clutch, in combination, a revoluble hub having an annular shoulder, a spring disk bolted against said shoulder, slip rings mounted upon said hub contiguous to said shoulder, an annular magnet carrying member secured to said disk on the side thereof opposite said slip rings, a magnet mounted on said clutch member, an electrical connection between said winding and said slip rings located in the space between said clutch member and said hub, a second hub in axial alinement with said first mentioned hub, a spring disk secured to said second hub, and an annular clutch member carried by said second spring disk to be attracted by said magnet, said two clutch members having engaging parts contiguous to the outer peripheries thereof.

21. A magnetic clutch provided with two rotary members, one having adjacent to its outer periphery a friction ring to engage the other, and an electromagnetic winding carried by one of said members within the inner periphery of said friction ring, said ring being adapted to space said members when attracted and being adjustable to compensate for the wear thereof to maintain the desired air gap.

22. A clutch provided with clutch members, one having a friction ring to engage the other and to hold the same in a spaced relation therewith and a pin projecting through one of said members and movable into engagement with the other to measure the distance therebetween when in engagement for determining the wear of said ring.

23. A magnetic clutch provided with two rotary members, an electromagnetic winding and a friction ring both mounted on one of said members concentric to the axis thereof, said ring being of greater radius than said winding and projecting from its respective rotary member to maintain an air gap between the same and said other rotary member, and means operable from the exterior of the clutch to measure the air gap between the said members.

24. A magnetic clutch provided with two rotary members, one provided with an electromagnetic winding to effect attraction of the other, a friction ring on one of said members to engage the other and to hold said members in a spaced relation, a device carried by said clutch for measuring the distance between said members when attracted and means for adjusting said ring to compensate for the wear thereof.

In witness whereof, I have hereunto subscribed my name in the presence of two witnesses.

CLARK T. HENDERSON.

Witnesses:
FRANK H. HUBBARD,
LEONARD A. WATSON.